US009961576B2

(12) United States Patent
Szymanik et al.

(10) Patent No.: US 9,961,576 B2
(45) Date of Patent: May 1, 2018

(54) WI-FI RADIO HEALTH SCORE

(71) Applicant: Comcast Cable Communications, LLC, Philadelphia, PA (US)

(72) Inventors: Colleen Szymanik, Philadelphia, PA (US); Alexander Roscoe, Philadelphia, PA (US); Darrell DeRosia, Austin, TX (US); Bradley Mayer, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days. days.

(21) Appl. No.: 14/883,771

(22) Filed: Oct. 15, 2015

(65) Prior Publication Data
US 2017/0111811 A1    Apr. 20, 2017

(51) Int. Cl.
| | |
|---|---|
| H04W 24/08 | (2009.01) |
| H04B 17/336 | (2015.01) |
| H04L 12/26 | (2006.01) |
| H04W 74/06 | (2009.01) |
| H04L 12/46 | (2006.01) |
| H04W 84/12 | (2009.01) |

(52) U.S. Cl.
CPC .......... *H04W 24/08* (2013.01); *H04B 17/336* (2015.01); *H04L 12/4633* (2013.01); *H04L 43/0829* (2013.01); *H04W 74/06* (2013.01); H04W 84/12 (2013.01)

(58) Field of Classification Search
CPC ............ H04L 12/4633; H04L 43/0829; H04B 17/336; H04W 74/06
See application file for complete search history.

(56) References Cited

U.S. PATENT DOCUMENTS

| | | | |
|---|---|---|---|
| 7,489,661 | B2 | 2/2009 | Hills et al. |
| 8,462,751 | B1 | 6/2013 | Dehghan et al. |
| 8,824,442 | B2 | 9/2014 | Lea et al. |
| 9,179,346 | B1 | 11/2015 | Pawar et al. |
| 2004/0047324 | A1 | 3/2004 | Diener |
| 2007/0168200 | A1 | 7/2007 | Shimizu |
| 2007/0280332 | A1 | 12/2007 | Srikanteswara et al. |

(Continued)

FOREIGN PATENT DOCUMENTS

| | | |
|---|---|---|
| CN | 101784073 A | 7/2010 |
| WO | 2014158131 A1 | 10/2014 |

OTHER PUBLICATIONS

Dalai, Upena D., and Y. P. Kosta. "Adaptive Parameters Based Transmission Control and Optimization in Mobile WiMAX at Physical Layer." (2009).

(Continued)

*Primary Examiner* — Siming Liu
(74) *Attorney, Agent, or Firm* — Banner & Witcoff, Ltd.

(57) ABSTRACT

Systems and methods for determining the health score of a Wi-Fi radio are described. Data associated with the Wi-Fi radio and/or an access point encapsulating the Wi-Fi radio may be received. Various parameters related to the Wi-Fi radio and/or an access point encapsulating the Wi-Fi radio may be determined. Weights may be assigned to the parameters, and the health score may be calculated using the weighted parameters. Default values may be assigned to the parameters if the initial determination of the parameter is below a minimal value. Configuration parameters related to the Wi-Fi radio, the access point, or neighboring access points may be transmitted based on the calculated health score.

20 Claims, 7 Drawing Sheets

(56) References Cited

U.S. PATENT DOCUMENTS

| | | |
|---|---|---|
| 2008/0069063 A1 | 3/2008 | Li et al. |
| 2010/0177639 A1 | 7/2010 | Nam |
| 2010/0250746 A1 | 9/2010 | Murase |
| 2011/0088631 A1 | 4/2011 | Hsieh et al. |
| 2011/0103242 A1 | 5/2011 | Hittel et al. |
| 2011/0250882 A1 | 10/2011 | Gao et al. |
| 2012/0026882 A1 | 2/2012 | Park et al. |
| 2012/0028664 A1 | 2/2012 | Zhang et al. |
| 2012/0045012 A1 | 2/2012 | Alapuranen |
| 2012/0122463 A1 | 5/2012 | Chen et al. |
| 2013/0142511 A1 | 6/2013 | Spraggs et al. |
| 2013/0272285 A1 | 10/2013 | Goldsmith et al. |
| 2013/0281143 A1 | 10/2013 | Nentwig et al. |
| 2014/0003380 A1 | 1/2014 | Han et al. |
| 2014/0036691 A1 | 2/2014 | Madan et al. |
| 2014/0036816 A1 | 2/2014 | Madan et al. |
| 2014/0044054 A1 | 2/2014 | Kim et al. |
| 2014/0071846 A1 | 3/2014 | Hintersteiner et al. |
| 2014/0086168 A1 | 3/2014 | Bao et al. |
| 2014/0092860 A1 | 4/2014 | Kneckt et al. |
| 2014/0119316 A1 | 5/2014 | Linden et al. |
| 2014/0233502 A1 | 8/2014 | Fong et al. |
| 2014/0256329 A1 | 9/2014 | Cao et al. |
| 2014/0314003 A1 | 10/2014 | Zhou et al. |
| 2014/0349745 A1 | 11/2014 | Russo et al. |
| 2014/0369242 A1 | 12/2014 | Ng et al. |
| 2014/0376496 A1 | 12/2014 | Kozaki et al. |
| 2015/0016353 A1 | 1/2015 | Lee |
| 2015/0023202 A1 | 1/2015 | Shattil |
| 2015/0029959 A1 | 1/2015 | Da et al. |
| 2015/0043363 A1 | 2/2015 | Koskinen et al. |
| 2015/0055569 A1 | 2/2015 | Ju et al. |
| 2015/0063323 A1 | 3/2015 | Sadek et al. |
| 2015/0078346 A1 | 3/2015 | Farhadi et al. |
| 2015/0103685 A1 | 4/2015 | Butchko et al. |
| 2015/0126207 A1 | 5/2015 | Li et al. |
| 2015/0189513 A1 | 7/2015 | Schmidt et al. |
| 2015/0245364 A1 | 8/2015 | Yacovitch et al. |
| 2015/0270882 A1 | 9/2015 | Shattil |
| 2015/0271829 A1 | 9/2015 | Amini et al. |
| 2015/0271837 A1 | 9/2015 | Larsson et al. |
| 2015/0312900 A1 | 10/2015 | Pajukoski et al. |
| 2015/0318965 A1 | 11/2015 | Sawai |
| 2015/0350949 A1 | 12/2015 | Wang et al. |
| 2015/0351026 A1 | 12/2015 | Lee et al. |
| 2016/0219408 A1 | 7/2016 | Yang et al. |

OTHER PUBLICATIONS

Sridharan, M., et al. "NVGRE: Network virtualization using generic routing encapsulation." IETF draft (2011).
Nov. 29, 2016—(EP) Extended Search Report—App 16177542.4.
Extended European Search Report—EP Application No. 16193955.8—dated Mar. 8, 2017.
Dec. 19, 2017—European Office Action—EP 16177542.4.

WI-FI RADIO HEALTH SCORE

BACKGROUND

As Wi-Fi networks become more and more prevalent, there is a greater need to assess the health of the Wi-Fi radios that make up the Wi-Fi networks. However, current processes for ascertaining the health of a Wi-Fi radio are often specific to the manufacturer of the access points incorporating the Wi-Fi radio. Furthermore, these processes often require a special chip set on the access point to generate the parameters needed to calculate the health of the Wi-Fi radio. There remains an ever-present need for measuring the health of the Wi-Fi radios that make up a Wi-Fi network without having to tailor the measuring to conform to the specifics of the numerous different types of devices making up the Wi-Fi network.

SUMMARY

This summary is not intended to identify critical or essential features of the disclosures herein, but instead merely summarizes certain features and variations thereof. Other details and features will also be described in the sections that follow.

A method described herein may comprise receiving one or more general routing encapsulation (GRE) packets as a part of wireless transmissions from one or more wireless transmitters and extracting parameters and media access control (MAC) addresses associated with the parameters from the GRE packets. Based on the extracted parameters, various Wi-Fi parameters may calculated, including, but not limited to, a signal-to-noise ratio average of a Wi-Fi radio for a polling cycle, a number of users associated with the Wi-Fi radio for the polling cycle, interface statistics associated with the Wi-Fi radio for the polling cycle, and a channel contention of the Wi-Fi radio for the polling cycle. Each of the determined parameters may be weighted. A score for the Wi-Fi radio may be calculated using the weighted signal-to-noise ratio average, the weighted number of users, the weighted interface statistics, and the weighted channel contention.

In some aspects, extracting the parameters may comprise extracting a total number of packets transmitted by the Wi-Fi radio during a first time interval and a total number of packets re-transmitted by the Wi-Fi radio during the first time interval. In some aspects, determining the interface statistics associated with the Wi-Fi radio for the polling cycle comprises determining the total number of packets transmitted by the Wi-Fi radio during the polling cycle and a total number of packets re-transmitted by the Wi-Fi radio during the polling cycle. Determining the interface statistics associated with the Wi-Fi radio for the polling cycle may further comprise determining the total number of packets transmitted by the Wi-Fi radio during a prior polling cycle and a total number of packets re-transmitted by the Wi-Fi radio during the prior polling cycle.

In some aspects, the number of users associated with the Wi-Fi radio may be assigned a default value when the number of users associated with the Wi-Fi radio for the polling cycle is below a minimum. Additionally, the signal-to-noise ratio average associated with the Wi-Fi radio may be assigned a default value when the signal-to-noise ratio average associated with the Wi-Fi radio for the polling cycle is below a minimum or above a maximum.

In some aspects, weighting the determined parameters may comprise assigning a first weight to the signal-to-noise ratio average, the interface statistics and the channel contention, and assigning a second weight to the number of users, wherein the first weight and the second weight are different. The health score of the Wi-Fi radio may be calculated by summing one or more of the weighted signal-to-noise ratio average, the weighted number of users, the weighted interface statistics, and the weighted channel contention. A new configuration setting may be transmitted to the Wi-Fi radio based on the calculated score.

A method described herein may comprise determining, for a first time interval, a signal-to-noise ratio average of a Wi-Fi radio, a number of users associated with the Wi-Fi radio, interface statistics associated with the Wi-Fi radio and a channel contention of the Wi-Fi. A weight may be assigned to each of the determined signal-to-noise ratio average, number of users, interface statistics, and channel contention. A score for the Wi-Fi radio may be calculated using the weighted signal-to-noise ratio average, the weighted number of users, the weighted interface statistics, and the weighted channel contention. One or more configuration parameters may be transmitted to an access point associated with the Wi-Fi radio based on the calculated score.

In some aspects, determining the interface statistics associated with the Wi-Fi radio may comprise determining a total number of packets transmitted by the Wi-Fi radio during the first time interval and a total number of packets re-transmitted by the Wi-Fi radio during the first time interval. Determining the interface statistics associated with the Wi-Fi radio for first time interval may further comprise determining the total number of packets transmitted by the Wi-Fi radio during a previous time interval and a total number of packets re-transmitted by the Wi-Fi radio during the previous time interval.

In some aspects, the one or more configuration parameters may comprise an instruction to the access point to broadcast one or more Service Set Identifiers (SSIDs). The method may further utilize a rules engine to generate the one or more configuration parameters. Generating the one or more configuration parameters may comprise performing, by the rules engine, historical trend analysis.

The foregoing methods and other methods described herein may be performed by a system, a computing device, a computer readable medium storing computer-executable instructions for performing the methods, and/or an apparatus having a processor and memory storing computer-executable instructions for performing the methods.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
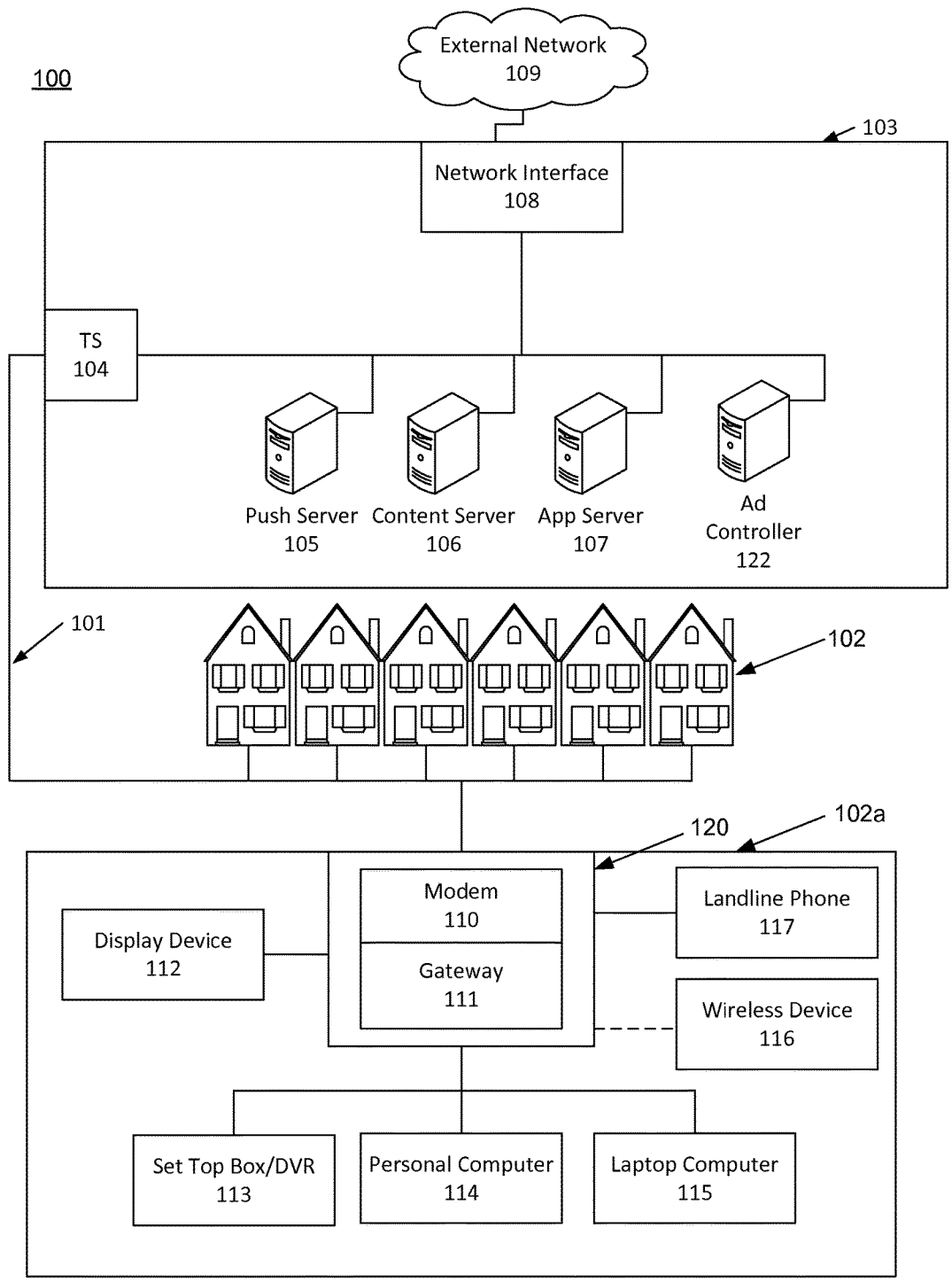
FIG. 1 illustrates an example network of devices according to one or more illustrative aspects of the disclosure.

FIG. 1 illustrates an example data access and distribution network 100 on which many of the various features described herein may be implemented. Network 100 may be any type of data distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as homes 102, to a local office (e.g., a central office or headend 103). The local office 103 may transmit downstream data signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements and/or providing content recommendations to users, as will be explained in further detail below. Another application server may be responsible for formatting and inserting advertisements in a video stream being transmitted to the homes 102.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
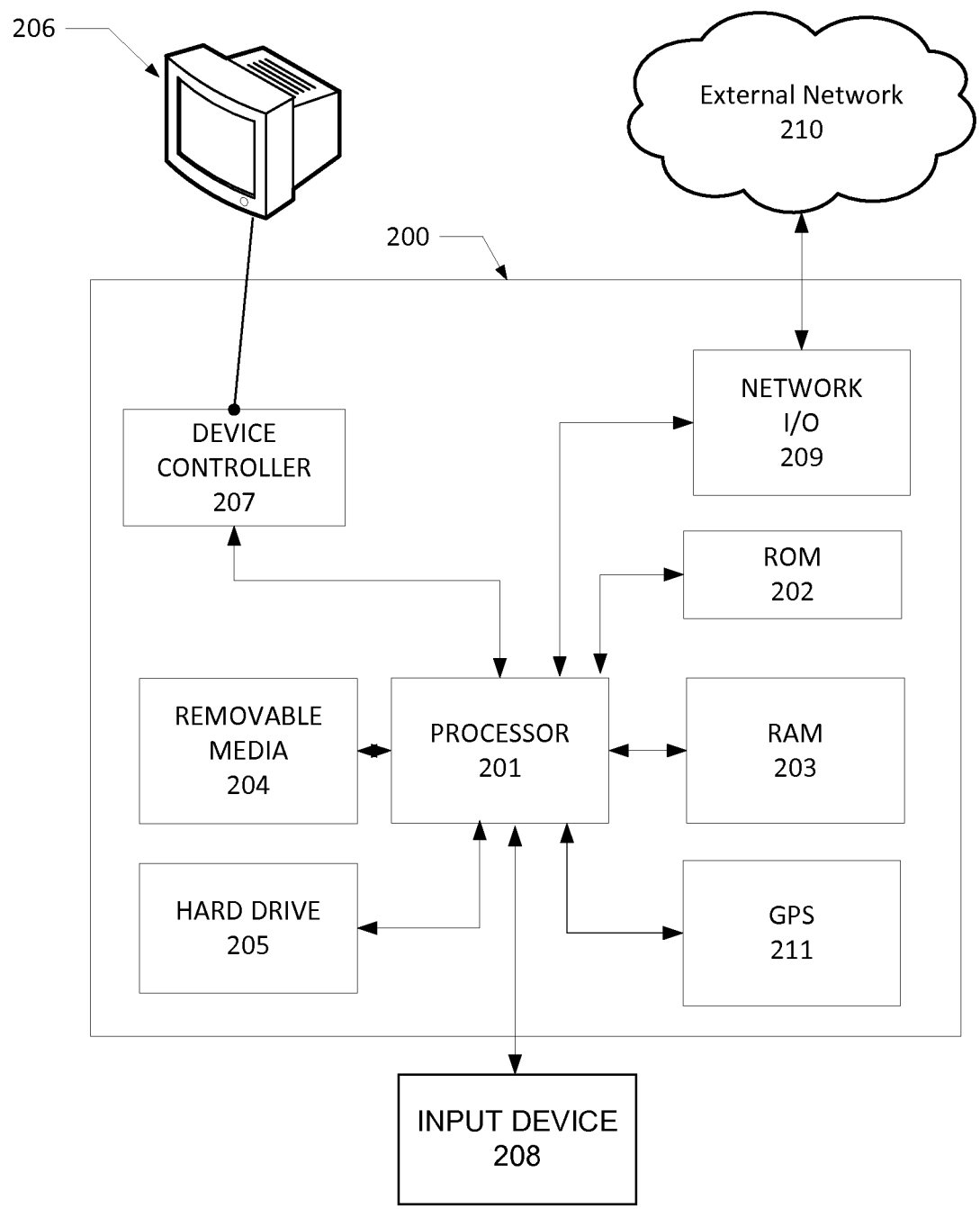
FIG. 2 illustrates an example hardware and software platform on which various elements described herein can be implemented.

FIG. 2 illustrates general hardware and software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Figure 3:
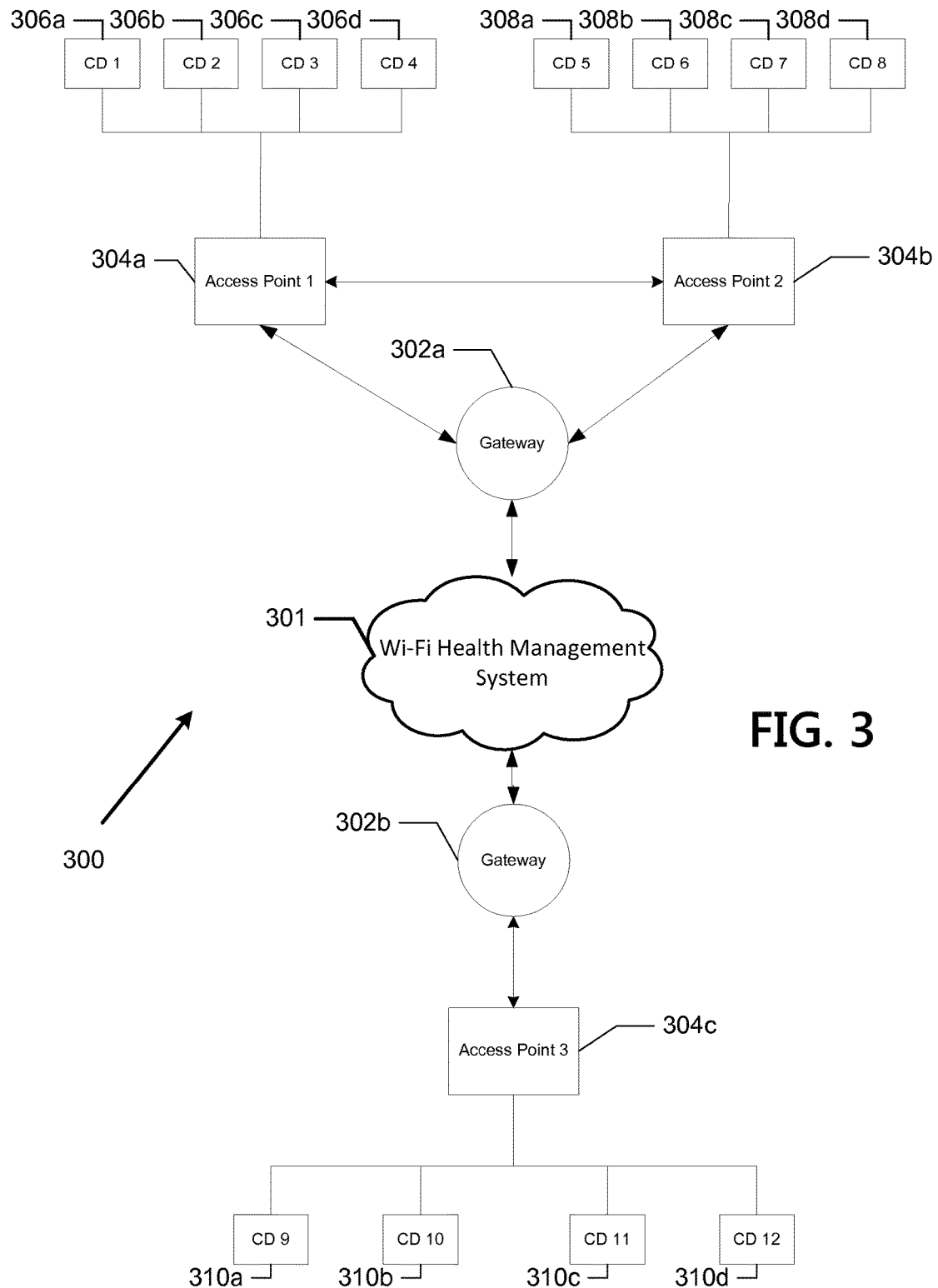
FIG. 3 illustrates an example layout of exemplary components according to one or more illustrative aspects of the disclosure.

FIG. 3 illustrates an example layout of the components according to one or more illustrative aspects of the disclosure. As shown in FIG. 3, a Wi-Fi Health Management System (HMS) 301 may manage one or more access points, such as access points 304a-c. The Wi-Fi HMS may be any computing device, such as that shown in FIG. 2, that is configured to perform the steps described herein. Access points 304a-c may be standalone access points (as shown) or may be embedded within another device, such as a modem. The modem may be a cable modem that is integrated with a wireless router. Each access point 304a-c may encapsulate one or more Wi-Fi radios, any of which may be the subject of a Wi-Fi radio health score. The Wi-Fi radios may be encapsulated within the modem that holds the access point(s). The Wi-Fi HMS 301 may communicate with access points 304a-c via gateways 302a and 302b. Gateways 302a and 302b may be standalone components (as shown) or may be integrated with the access points 304a-c to form a standalone device, or may be integrated into a cable modem along with an access point.

Each access point 304a-c may be in communication with one or more client devices. For example, access point 304a may be in communication with client devices 306a-d, access point 304b may be in communication with client devices 308a-d, and access point 304c may be in communication with client devices 310a-d. Client devices 306a-d, 308a-d, and 310a-d may be any user-device that utilizes Wi-Fi to communicate with an access point, including wireless laptops, mobile phones, mobile televisions, tablet computers, smartphones, premises security sensors, home appliances (e.g. refrigerators, dishwashers, etc.), digital cameras, audio systems, and any other desired devices. Communication between any of client devices 306a-d, 308a-d, and 310a-d, access points 304a-c, gateways 302a and 302b, and Wi-Fi HMS 301 may be bi-directional. For example, access point 304a may analyze traffic from client devices 306a-d to send relevant communication parameters upstream to Wi-Fi HMS 301 via gateway 302a. The communication parameters may generally indicate some measured aspect of a wireless communication, and are described in greater detail below regarding FIG. 4. In return, Wi-Fi HMS 301 may send various configuration parameters to access point 304a via gateway 302a. The configuration parameters may generally relate to a configuration setting of a Wi-Fi Radio, an access point, and/or a Wi-Fi network.

Figure 4:
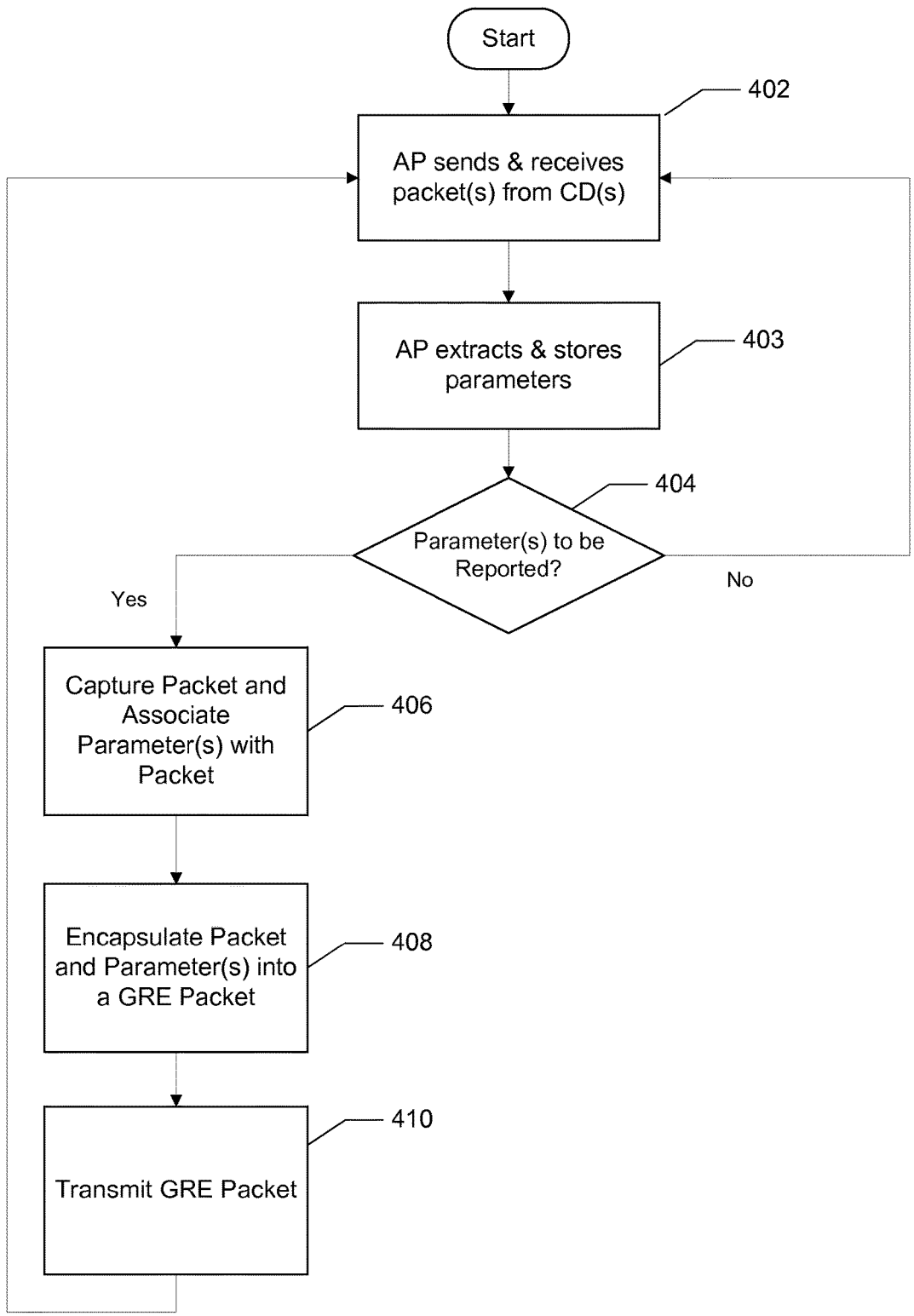
FIG. 4 illustrates an example method for sending data used in determining a health score of a Wi-Fi radio according to one or more illustrative aspects of the disclosure.

FIG. 4 illustrates an example method for sending the data used in determining the health score of one or more Wi-Fi radios according to one or more illustrative aspects of the disclosure. At 402, an access point may be sending and/or receiving one or more packets from one or more client devices. At 403, the access point may locally track and store one or more Wi-Fi related parameters based on the transmitted packets and/or received packets. These parameters can be tracked and stored for every packet sent to or received from every client device or at a select traffic-based interval (for example, the parameters can be tracked and stored for every Nth packet, wherein N may be configurable). Alternatively, the Wi-Fi related parameters may be tracked and stored for select time intervals.

Within an access point, different Wi-Fi related parameters can be tracked and stored for different client devices, and tracking times/instances can vary for different client devices. Additionally, different access points may be configured to track different Wi-Fi related parameters for different tracking times/instances.

For example, within an access point, the tracking and storing of W-Fi parameters may be consistent among the client devices communicating with the Wi-Fi radio(s) in the access point, or may vary by client device. In one instance, a first Wi-Fi related parameter (for example, a signal-to-strength ratio) may be continuously tracked and stored for every packet sent to or received from a first client device and a second Wi-Fi related parameter (for example, a channel contention) may be tracked and stored for every packet sent to or received from the first client device only for a select time interval. In the same instance, the first Wi-Fi related parameter may be tracked and stored for every packet sent to or received from a second client device during a select time interval while the second Wi-Fi related parameter may be tracked and stored for every Nth packet (for example, every $100^{th}$ packet) sent to or received from the second client device.

In a second example, a first access point and a second access point may be configured to track, for a first set of client devices and a second set of client devices, respectively, different Wi-Fi related parameters for different tracking times/instances. A first access point may track and store multiple Wi-Fi related parameters for every packet transmitted to and/or from the client device(s) the access point services. A second access point may track and store a Wi-Fi related parameter for every Nth packet sent to and/or from a first client device the second access point services, and the second access point may track and store multiple Wi-Fi related parameters for selected time intervals for a second client device the second access point services. Alternatively, a first access point and a second access point may be configured to track their corresponding client devices in an identical manner, while a third access point may be configured to track its corresponding client devices in a different manner.

Similarly, an access point containing multiple Wi-Fi radios may have different settings for each Wi-Fi radio. For example, the parameters corresponding to a first Wi-Fi radio in the access point may be continuously tracked and stored. The parameters corresponding to a second Wi-Fi radio in the access point and a third Wi-Fi radio in the access point may be tracked and stored for select time intervals. The parameters corresponding to a fourth Wi-Fi radio in the access point may be tracked and stored for every Nth packet sent to and/or from the fourth Wi-Fi radio.

The access points may poll the client devices to retrieve the Wi-Fi related parameters. Alternatively, the Wi-Fi related parameters can obtain the parameters by measuring and/or evaluating traffic that the Wi-Fi radio sends and receives from client devices through the normal course of usage. For example, a client device that is streaming a video program to a user may send content requests to the access point, and receive the streaming program transmission from the access point, and the access point may evaluate the content requests and streamed program transmission signals to determine the Wi-Fi parameters, without requiring the client device to send any separate signals for the Wi-Fi parameters. The latter may be advantageous in that obtaining the parameters via analyzing traffic passing through the Wi-Fi radio prevents the system from being susceptible to vendor-specific restrictions. That is, collecting the data directly from the Wi-Fi radio by analyzing the traffic that flows through the Wi-Fi radio allows for the health score of any Wi-Fi network to be calculated, regardless of the types of cable modems that make up the network. As noted above, the frequency and/or time intervals for collecting these parameters can be configured for each access point, and further configured for each Wi-Fi radio in the access point, and for each client device serviced by the access point.

The access point may monitor parameters related to the configuration of the Wi-Fi radio itself. One such parameter may be the noise floor of the Wi-Fi radio. The access point may also monitor parameters related to the client devices. One such parameter may be the number of concurrent users on the access point and/or on each Wi-Fi radio in the access point. The access point may also monitor parameters related to traffic passed between the client devices and the access point. By monitoring the packets that the access point sends to client devices and the packets that the access point receives from the client devices, the access point can monitor various interface statistics. These may include, but are not limited to, total packets received by the Wi-Fi radio, the number of packets that had to be re-transmitted by the Wi-Fi radio, the error rate, and the like.

By analyzing the packets received from a first client device connected to the access point, the access point can determine the received signal strength indicator (RSSI) for the first client device. The RSSI for a client device is a measurement of the power present in a received Wi-Fi radio signal. Generally, a larger distance between the client device and the access point (i.e. the Wi-Fi radio) results in a low RSSI value. Similarly, interference and other environmental factors may also affect the RSSI value of client devices.

By analyzing incoming and outgoing packet traffic, the access point may further track the channel contention during select instances or time intervals. Channel contention represents the amount of time the access point is unable to send and/or receive traffic due to the carrier sense multiple access (CSMA) threshold being exceeded by the Wi-Fi radio in the access point. When the CSMA threshold is exceeded, the radio is unable to transmit or receive Wi-Fi packets to or from client devices due to energy detection (ED) on the channel or clear channel assessment (CCA).

At 404, the access point may determine if the Wi-Fi related parameters that have been locally stored are to be transmitted upstream to Wi-Fi HMS 301. The access point may be configured to transmit the parameters at select times. For example, the access point may be configured to transmit the parameters every 500 ms, 1 second, 60 seconds, 1 minute, 5 minutes, etc. Alternatively, the access point may be configured to transmit the parameters after a predetermined amount of traffic has passed through the access point. For example, the parameters may be sent every time the access point receives 100 Mb from one client device, or from all client devices. In another instance, the access point may dynamically transmit the parameters upstream if the value of certain parameters hits a maximum or minimum level. For example, the parameters may be sent every time a number of associated users on a Wi-Fi radio reach higher than 10 users. In another instance, the access point may send one or more parameters upstream at the request of Wi-Fi HMS 301. If, at 404, the access point determines that the parameters are not to be reported upstream to the Wi-Fi HMS 301, the access point may return to 402.

If, at 404, the access point determines that one or more parameters are to be reported upstream to the Wi-Fi HMS 301, the access point may, at 406, capture an incoming packet and associate one or more parameters with the captured packet. For example, access point 304*a* may capture a packet from client device 306*a* and associate a locally stored RSSI parameter of the client device 306*a* to the captured packet. In another example, access point 304*a* may capture a packet from client device 306*a* and associate locally stored channel contention and error rate parameters of Wi-Fi radio(s) in access point 304*a* with the captured packet. The associated data and/or the captured packet may be time-stamped by the access point.

At 408, the access point may encapsulate the captured packet from the client device 306*a* and the associated parameter(s) into a Generic Routing Encapsulation (GRE) packet. Encapsulation may include inserting the media access control (MAC) address of the client device 306*a* into the GRE header. In one example, the RSSI parameter may be inserted into an unused field in the GRE packet header. An advantage of encapsulating the received packet into a GRE packet is the preemption of additional traffic between the access points and the gateway. A GRE packet, even after encapsulating a packet received at an access point, has several unused fields in its header. These fields can be used to transmit the Wi-Fi radio parameters, thus eliminating the need to separately transmit the Wi-Fi radio parameters. As a result, parameters from client devices can be collected and transmitted on a more frequent basis, allowing for more granular, up-to-date network metrics.

Once the packet received from the client device, and its associated parameters have been encapsulated into a GRE packet, the access point may, at 410, transmit the GRE packet to the Wi-Fi HMS 301. The GRE packet may be sent via an already-existing GRE tunnel between the access point and the gateway. Alternatively, the GRE pathway between the access point and the Wi-Fi HMS 301 may be established once the encapsulating GRE packet is ready for transmittal. After transmitting the encapsulating GRE packet, the access point may return to 402.

Figure 5:
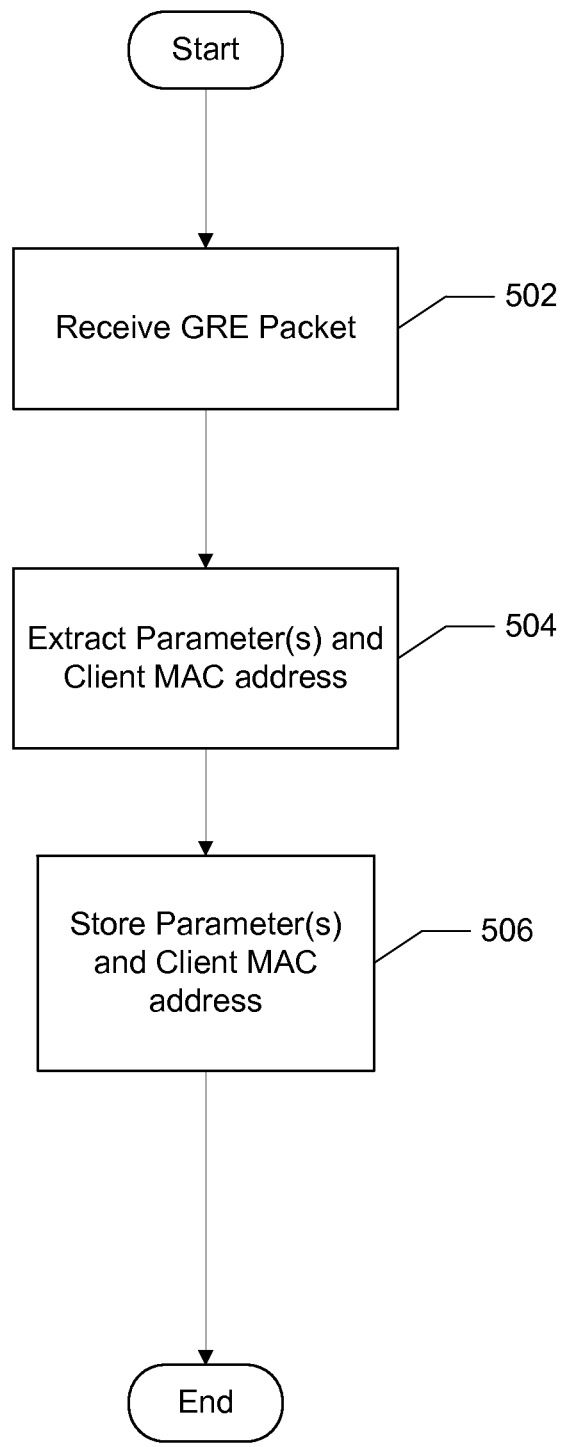
FIG. 5 illustrates an example method for receiving data used in determining a health score of a Wi-Fi radio according to one or more illustrative aspects of the disclosure.

FIG. 5 illustrates an example method for receiving and extracting the Wi-Fi radio parameters used in determining the health score of the Wi-Fi radio according to one or more illustrative aspects of the disclosure. At 502, the Wi-Fi HMS 301 receives the encapsulating GRE packet. At 504, the Wi-Fi HMS 301 extracts the MAC address of the client device from a header of the GRE packet, and further extracts the Wi-Fi radio parameter(s) from the header of the GRE packet. The extracted MAC address and Wi-Fi radio parameter(s) are then stored locally. The Wi-Fi HMS 301 may associate the extracted MAC address with the extracted Wi-Fi radio parameter(s) prior to storing this data. The Wi-Fi HMS 301 may timestamp the extracted Wi-Fi radio parameter(s) prior to storing this data. Alternatively, the gateway may extract the MAC address and the Wi-Fi radio parameter(s) upon receiving the encapsulated GRE packet from the access point. The gateway may then associate the MAC address with the Wi-Fi radio parameter(s) and store the extracted data.

In addition to storing the extracted MAC address and Wi-Fi radio parameter(s), the Wi-Fi HMS 301 may also aggregate the data in preparation for calculation of the Wi-Fi radio health score. For example, extracted parameters of the same type (RSSI, noise floor, etc.) may be grouped together and further be sub-grouped based on the access point and/or Wi-Fi radio from which the data was received. Alternatively, extracted parameters may be grouped by the timestamps. Alternatively, all extracted Wi-Fi parameters received from a particular access point or Wi-Fi radio may be grouped together and further sub-grouped based on the timestamps of the extracted Wi-Fi parameters. For example, all extracted Wi-Fi parameters from all Wi-Fi radios in access point 304a received between $t_0$ and $t_1$ may be stored in a first group. All extracted Wi-Fi parameters from a first Wi-Fi radio in access point 304a received between $t_1$ and $t_2$ may be stored in a first group and all extracted Wi-Fi parameters from a second Wi-Fi radio in access point 304a received between $t_1$ and $t_2$ (or a different time interval) may be stored in a second group. In another example, all extracted RSSI parameters received from access point 304b between $t_0$ and $t_1$ may be stored in a first group, and all extracted RSSI parameters received from access point 304b between $t_1$ and $t_2$ can be stored in a second group.

Figure 6:
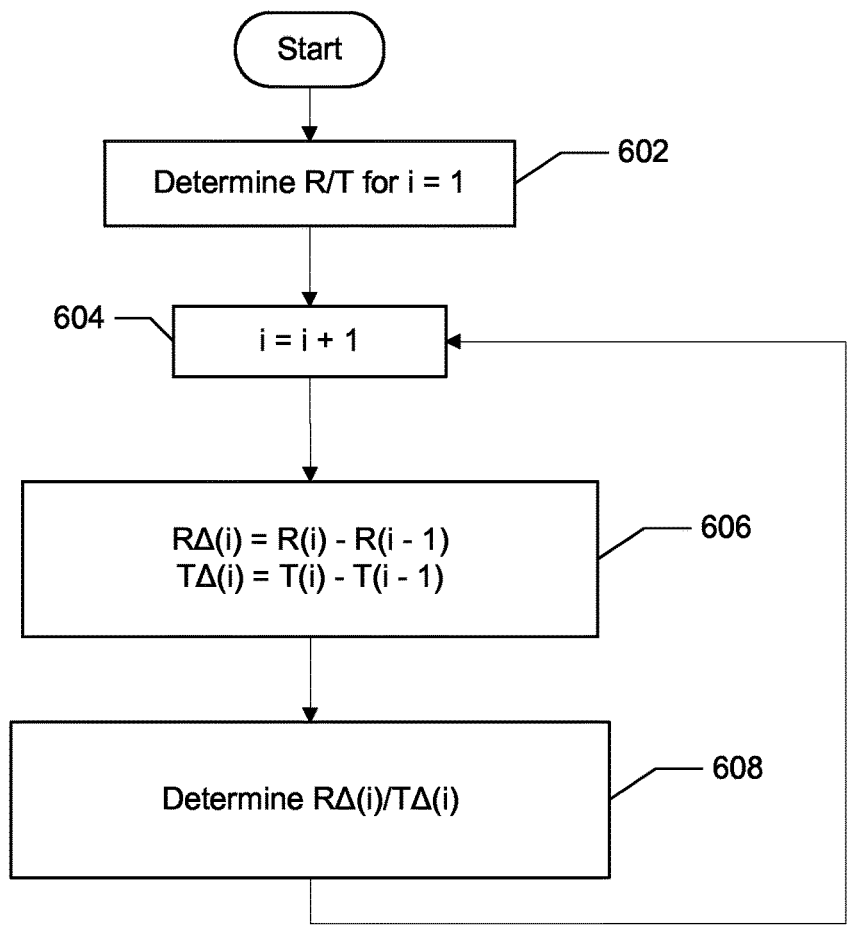
FIG. 6 illustrates an example method for calculating interface statistics used in health score calculations according to one or more illustrative aspects of the disclosure.

FIG. 6 illustrates an example method for preliminary analysis that may be performed by the Wi-Fi HMS 301 prior to or during the calculation of the Wi-Fi radio health score. In some instances, it may be necessary to analyze the data that is extracted from the GRE packets sent by the access point prior to or during the calculating the Wi-Fi radio health score. For example, Wi-Fi HMS 301 may determine that a Wi-Fi radio health score is to be calculated for a first Wi-Fi radio for a polling cycle. The polling cycle over which the Wi-Fi radio health score is calculated may be less than, equal to, or greater than the time intervals for which the Wi-Fi related parameters were tracked and stored. Prior to calculating the Wi-Fi radio health score for the polling cycle, the Wi-Fi HMS 301 may first calculate the interface statistics needed to calculate the Wi-Fi radio health score for the polling cycle. The interface statistics used in the calculation of the Wi-Fi radio health score for the polling cycle require two different parameter values from each Wi-Fi radio—the total number of packets transmitted by the Wi-Fi radio during the polling cycle and the total number of packets retransmitted by the Wi-Fi radio during the polling cycle.

Additionally, the current calculation of the interface statistics is based on the prior calculation of the interface statistics (that is, the interface statistics calculated for the Wi-Fi radio for the previous polling cycle). For example, at 602, a baseline ratio is calculated for a Wi-Fi radio. R(1) represents the total number of retransmitted packets for the Wi-Fi radio for i=1 (the first polling cycle) and T(1) represents the total number of transmitted packets for the Wi-Fi radio for i=1 (the first polling cycle). The baseline ratio calculation, defined at R(1)/T(1), may be used the first time the interface statistics are calculated for the Wi-Fi radio (i.e. for i=1). The value of i is then incremented by a value of one at 604 for each subsequent calculation.

In some embodiments, every subsequent calculation of the interface statistics calculated for the Wi-Fi radio will account for the change from the current set of data to the data used in the previous calculation. For example, when the interface statistics for the Wi-Fi radio are calculated for a second polling cycle (i.e. for i=2) at 606, the current set of data will be used to calculate R(2) (the total number of transmitted packets for the Wi-Fi radio for i=2) and T(2) (the total number of transmitted packets for the Wi-Fi radio for i=2). The change between the current set of data and the last set of data for the Wi-Fi radio will then be accounted for as follows:

$$R\Delta(i)=R(i)-R(i-1)$$

$$T\Delta(i)=T(i)-T(i-1)$$

Here, R(i) and T(i) represents the current data for the Wi-Fi radio and R(i−1) and T(i−1) represents the last set of data for the Wi-Fi radio. Applying these equations to the example results in:

$$R\Delta(2)=R(2)-R(1)$$

$$T\Delta(2)=T(2)-T(1)$$

At 608, the interface statistics for the Wi-Fi radio for i=2 are then calculated as RΔ(2)/TΔ(2). By taking into account the previous set of data, the interface statistics accounts for bursts of traffic on the Wi-Fi radio. For example, if the interface statistics for the Wi-Fi radio were only calculated once every twenty-four hours (i.e. over a 24-hour polling cycle), small periods of burstiness, during which data packets would have to be frequently re-sent, would remain unaccounted for. If however, the interface statistics for the Wi-Fi radio are calculated every five minutes (i.e. over a five minute polling cycle), shorter instances of traffic congestion at the Wi-Fi radio can be recognized. The polling cycles are dynamically configurable by the Wi-Fi HMS 301. Therefore, the interface statistics can be calculated every few seconds, every minute, every few minutes, every hour, every few hours, and so on. The interface statistics becomes more accurate if the time slices become smaller (i.e. if the polling cycles become more frequent). That is, as previously noted, calculating the interface statistics every few minutes will give a more accurate representation of the state of the Wi-Fi radio than calculating the interface statistics for the Wi-Fi radio every twenty-four hours.

Figure 7:
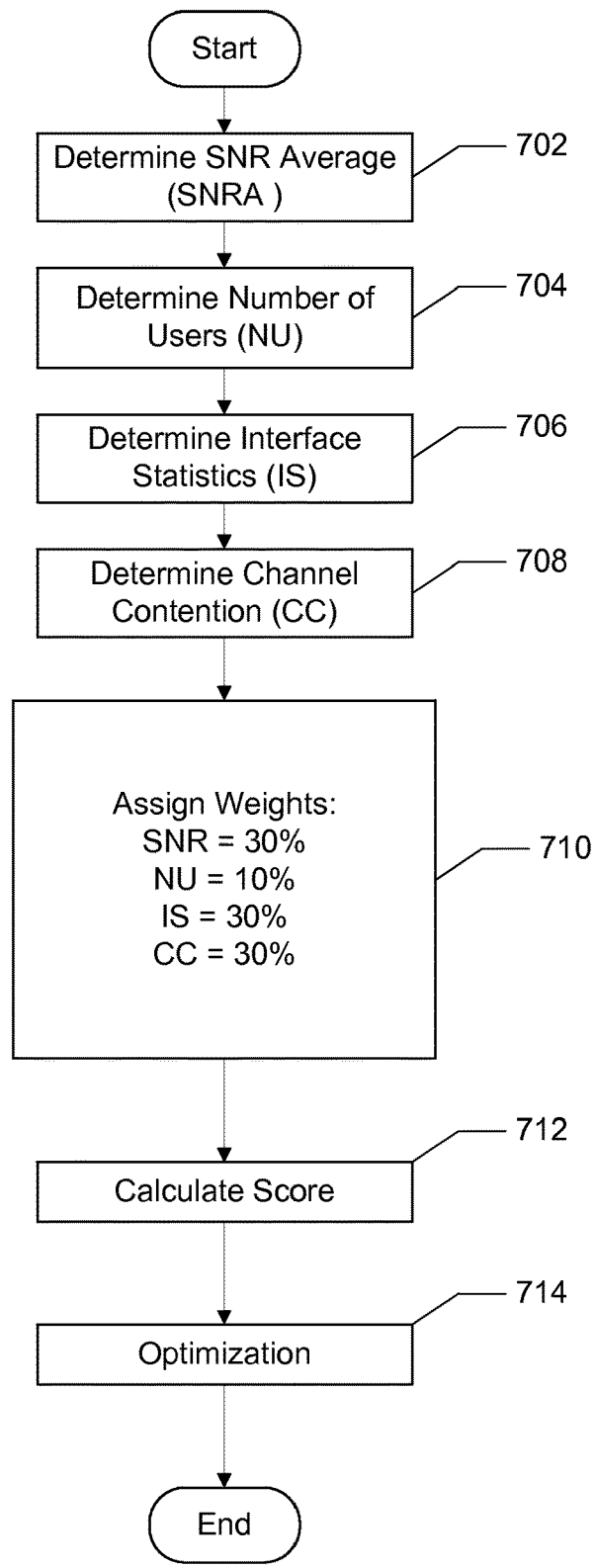
FIG. 7 illustrates an example method for calculating a health score of a Wi-Fi radio according to one or more illustrative aspects of the disclosure.

FIG. 7 illustrates an example method for calculating a health score of a Wi-Fi radio according to one or more illustrative aspects of the disclosure. The health score of the Wi-Fi radio may be calculated for a certain instance in time, or over a predetermined time range (also referred to as a polling cycle). The polling cycle over which the Wi-Fi radio health score is calculated may be less than, equal to, or greater than the time intervals for which the Wi-Fi related parameters were tracked and stored. At 702, a signal-to-noise ratio (SNR) average of the Wi-Fi radio may be determined. Individual SNR values are obtained by calculating the difference between the RSSI parameter value for a first client device and the noise floor of the Wi-Fi radio. The SNR average may then be calculated for a certain instance in time, or over a select time interval, or over a sliding window. The SNR average may be calculated for the Wi-Fi radio as a whole or separate SNR averages may be calculated for different radio frequency bands utilized by the Wi-Fi radio (2.4 GHz, 5 GHz, or the like).

At certain instances (for example, late at night or early in the morning), there may not be any users accessing the Wi-Fi radio. In such a case, because there are no incoming or outgoing packets at the Wi-Fi radio, there may be no RSSI parameters values or no noise floor. In turn, the SNR average for the Wi-Fi radio cannot be calculated. The assumption in such a scenario is that though the measurement of the SNR values may be weak, the SNR values themselves are not necessarily poor. Accordingly, it may be advantageous to not allow the overall health score to be improperly skewed due to an absence of traffic over the Wi-Fi radio. This may be done by introducing artificial values for one or more of the Wi-Fi parameters. In one instance, an artificial noise floor may be used when there is a minimal amount of traffic being serviced by the Wi-Fi radio. The artificial noise floor may be a default value or may be dynamically determined based on historic noise floor values. In another instance, an artificial value for the SNR average may be used when there are no packets being transmitted to or from the Wi-Fi radio. Such an artificial value may be determined based on the SNR average that was calculated during a prior time interval. Alternatively, the artificial value may be set to a default, predetermined value.

At 704, the number of associated users on each Wi-Fi radio on the access point is determined. Generally, if a Wi-Fi radio is sending packets to and receiving packets from multiple users, each user will have a time slice during which time his communications are processed by the Wi-Fi radio. Accordingly, the greater the number of people concurrently utilizing the Wi-Fi radio, the smaller the time slices that will be allocated to each user. The number of associated users may be calculated for a certain instance in time, or over a select time interval, or over a sliding window.

In some instances, as with the SNR average, the number of associated users may be zero (for example, late at night). It would be advantageous to prevent this from improperly skewing the health score, as the assumption is that there are no users because potential users are choosing not to access the network (not that there are no users because users cannot access the network). Accordingly, if there are no users on the Wi-Fi radio, an artificial value for this parameter may be introduced. The artificial value may be a default value or may be dynamically determined based on historic values of the number of associated users.

At 706, the interface statistics (IS) for the Wi-Fi radio are calculated. Generally, the interface statistics are directed to ascertaining the packet error rate and/or the packet retransmission rate of the Wi-Fi radio. The interface statistics for the Wi-Fi radio can be calculated for an instance in time, a polling cycle, or a sliding window. The calculation of the interface statistics for the Wi-Fi radio, discussed above in reference to FIG. 5, is based on the total number of retransmitted packets and the total number of transmitted packets. Additionally, a current calculation of the interface statistics for the Wi-Fi radio is based partly on the difference between the values of the current parameters (i.e. the current value of the total number of retransmitted packets and the current value of the total number of transmitted packets) and the values of the parameters used in the previous calculation of the interface statistics (i.e. the previous value of the total number of retransmitted packets and the previous value of the total number of transmitted packets).

At 708, the channel contention (CC) for the Wi-Fi radio is determined. The channel contention represents the percentage of time the channel used by the access point is occupied by activity from the Wi-Fi radio (as opposed to being occupied by activity from other Wi-Fi radios in the access points). Measured from a different perspective, the channel contention may represent the amount of time the access point is unable to send or receive the traffic of other Wi-Fi radios due to the channel being occupied by the Wi-Fi radio. The channel contention for the Wi-Fi radio can be calculated for an instance of time, over a time interval, or over a sliding window.

Once all four parameter values have been calculated, the Wi-Fi HMS 301 may, at step 710, assign weights to the parameters. Weighting the parameters may first require that each of the four parameters be normalized to fit within the range of [0, 100]. If normalization of any of the parameters results in a predetermined value, artificial values may be introduced as discussed above. The predetermined value for each of the parameters may be different. The weights assigned to each of the four parameters are dynamically configurable by the Wi-Fi HMS 301. In one example, the SNR average parameter calculated in step 702 may be assigned a weight of 30%, the NU parameter calculated in step 704 may be assigned a weight of 10%, the IS parameter calculated in 706 may be assigned a weight of 30%, and the CC parameter calculated in step 708 may be assigned a weight of 30%. The final health score of the Wi-Fi radio, which may be summed to a maximum value of 100, may be calculated in step 712 as follows:

$$30*\text{SNR Average}+10*\text{NU}+30*\text{IS}+30*\text{CC}$$

Once the health score of the Wi-Fi radio has been calculated, the network may be optimized at step 714. Alternatively, the calculation of the health score may be repeated for other Wi-Fi radios within the access point, as well as Wi-Fi radios in other access points, prior to optimization of the network. As noted above in reference to FIG. 3, the network includes multiple access points 304a-c, each with multiple Wi-Fi radios. Therefore, the optimization can be performed in relation to one or more Wi-Fi radios and/or one or more access points.

Optimization may include the evaluation of the overall health score of the Wi-Fi radio, as well as evaluation of one or more of the parameters making up the health score (SNR Average, number of associated users, interface statistics, and channel contention). For example, Wi-Fi HMS 301 may first analyze the health score of a Wi-Fi radio and determine that the health score of the Wi-Fi radio is low (for example, below a predetermined threshold). Wi-Fi HMS 301 may then evaluate the parameters used to calculate the health score to determine which parameters are contributing to the low health score. Wi-Fi HMS may then query a rules engine using the values of the parameters and/or the value of the health score to determine what changes should be effectuated through various configuration parameters. These various configuration parameters may generally be related to one or more of the Wi-Fi radio, the access point encapsulating the Wi-Fi radio, neighboring access points, and the Wi-Fi network as a whole. For example, the configuration parameters may include, but are not limited to, data rates, channel allocation, broadcast SSIDs, physical interface data rate, on/off state of Wi-Fi radio(s), and the power of the access points. The Wi-Fi HMS 301 may then optimize network 300 by dynamically changing the values of one or more configuration parameters.

Wi-Fi HMS 301 may utilize various techniques to determine the optimal values of the one or more configuration parameters. As mentioned above, in one instance, Wi-Fi HMS 301 may utilize a rules engine. The rules engine may store sets of historical data (that is, the Wi-Fi related parameters that were obtained by measuring and/or evaluating traffic that the Wi-Fi radios send and receive from client devices through the normal course of usage, and the parameters that were calculated by the Wi-Fi HMS 301 prior to calculating a Wi-Fi radio health score). The stored sets of historical data may include the values of the parameters themselves (RSSI, total retransmitted packets, interface statistics etc.) as well as the MAC address associated with each parameter.

The rules engine may additionally store rules correlating the values of the historical data to recommended actions (i.e. recommended changes in various configuration parameters). For example, the rules engine may store a rule indicating that if, for a Wi-Fi radio, the value of the NU parameter is above a predetermined threshold for a predetermined amount of time, the Wi-Fi HMS 301 should increase one or more of 1) the power level of the access point encapsulating the Wi-Fi radio, 2) the power level of one or more access points neighboring the access point encapsulating the Wi-Fi radio, or 3) the number of access points on the Wi-Fi network. Alternatively, the rules engine may store a rule indicating that if, for a Wi-Fi radio, the value of the NU parameter is within a first predetermined range for a predetermined amount of time, the Wi-Fi HMS 301 should increase the power level of the access point encapsulating the Wi-Fi radio, and if the value of the NU parameter is within a second predetermined range for a predetermined amount of time, the Wi-Fi HMS 301 should reconfigure the Wi-Fi network by recommending that an additional access point be added to the Wi-Fi network. In a second example, the rules engine may store a rule indicating that if, for a Wi-Fi radio, the channel contention is above a predetermined threshold, the Wi-Fi radio should be configured to change the channel being utilized. In a third example, the rules engine may store a rule indicating that if the Wi-Fi score is below a threshold, one or more radios in the access point may be disabled.

The rules engine may additionally store baseline values of the network related parameters (data rates, channel allocation, broadcast SSIDs) and prior behavior of the Wi-Fi HMS 301. For example, the rules engine may store a first set of baseline interval statistics calculated for a first Wi-Fi radio for a first access point during a first polling cycle and a health score calculated for the first Wi-Fi radio using at least the baseline interval statistics. The rules engine may also store a first optimization made to the first Wi-Fi radio or the first access point in response to the calculated health score of the first Wi-Fi radio. The rules engine may additionally store a second set of interval statistics calculated for the first Wi-Fi radio for the first access point during a second polling cycle (wherein the second polling cycle occurs after the optimizations). The storage of this data allows the rules engine to analyze how a certain type of optimization affects the various parameters of the Wi-Fi radio (here, how the first optimization affected the interface statistics of the first Wi-Fi radio).

Generally, by aggregating these types of data values over a period of time, the rules engine may perform historical trend analysis to provide the Wi-Fi HMS 301 insight on the configuration parameters that should be changed (including the optimal values of various configuration parameters) to best address the current issues of network 300. For example, if the health score for a first Wi-Fi radio is lower than a minimum value, Wi-Fi HMS 301 may analyze the calculated parameters of the first Wi-Fi radio (SNR average, NU, IS, CC). For example, Wi-Fi HMS 301 may analyze the values of these calculated parameters to determine which of the calculated parameter(s) is causing the low health score. Wi-Fi HMS 301 may then survey the rules engine for relevant prior optimizations that successfully resulted in an improvement in the relevant calculated parameter(s).

Wi-Fi HMS 301 may also utilize the rules engine to determine whether a low health score is a one-off event or whether the low health score is representative of a more consistent problem. For example, if a first Wi-Fi radio has a low health score, Wi-Fi HMS 301 may determine that the cause of the low health score is a larger than usual number of associated users (NU) for the polling cycle. The Wi-Fi HMS 301 may survey the rules engine (which, as described above, stores historical NU values as well as MAC addresses) to determine if this level of number of associated users is a rare abnormality or whether past polling cycles have shown a similar trend of high NU values. If it is the former, the Wi-Fi HMS 301 may elect not to change the values of any configuration parameters related to the network. If it is the latter, the Wi-Fi HMS 301 may, in one instance, determine that one or more additional access points need to be added in the area covered by the first Wi-Fi radio. In making this optimization, Wi-Fi HMS 301 may consider various external factors, such as cost, access point congestion, etc. The Wi-Fi HMS 301 may, in a second instance, determine that the high level of users is to be addressed by instructing the access point encapsulating the first Wi-Fi radio to broadcast additional SSIDs. Again, the Wi-Fi HMS 301 may consider a number of external factors, such as current configuration of the access point, current configurations of surrounding access points, cost, etc.

In either instance, the determination by the Wi-Fi HMS 301 may be independent of the rules engine or may be based on the rules engine notifying Wi-Fi HMS 301 of relevant past optimizations. For example, as discussed above, the Wi-Fi HMS 301 may survey the rules engine to determine whether the high level of users is an abnormality or representative of an ongoing trend. If the rules engine reports that the high level of users is representative of an ongoing trend, the Wi-Fi HMS 301 may compare the current ongoing trend to past trends via the rules engine. If a similar past trend is detected, Wi-Fi HMS 301 may further survey the rules engine for optimizations made in the past to address the similar past trend. Continuing with the above example, the rules engine may report that a comparably high number of users were previously detected in relation to a second Wi-Fi radio over multiple polling cycles. The rules engine may further report any optimizations that were made by the Wi-Fi HMS 301 in response to the comparably high number of users previously detected in relation to the second Wi-Fi radio. The rules engine may further report the subsequent values of the measured parameters and calculated parameters of the second Wi-Fi radio (i.e. the values of the measured parameters and calculated parameters of the second Wi-Fi radio after the Wi-Fi HMS 301 made the optimizations in response to the comparably high number of users previously detected in relation to the second Wi-Fi radio). The Wi-Fi HMS 301 may analyze the data reported by the rules engine when making optimization decisions in response to the high level of users detected on the first Wi-Fi radio.

If multiple instances of similar trends are reported by the rules engine, the Wi-Fi HMS 301 may analyze the optimizations made in each of these scenarios and may additionally analyze the outcome (e.g. the effectiveness) of the optimizations. For example, in response to the high number of users previously detected in relation to the second Wi-Fi radio, the Wi-Fi HMS 301 may have optimized the network by adding an additional access point. In response to the high number of users previously detected in relation to a third Wi-Fi radio, the Wi-Fi HMS 301 may have optimized the network by instructing the relevant access point to broadcast one or more additional SSIDs. When deciding how to optimize network 300 in response to the detected high level of users on the first Wi-Fi radio, the Wi-Fi HMS 301 may compare the effectiveness of the additional access point versus the effectiveness of the additional broadcast SSIDs.

The Wi-Fi HMS may additionally consider external factors in the comparison. For example, while adding the additional access point may have proven to be the more effective long-term solution (by successfully addressing the issue of the high number of users), it also may have been the more expensive solution. Based on current optimization constraints, the Wi-Fi HMS 301 may accordingly decide to optimize network 300 in response to the detected high level of users on the first Wi-Fi radio by instructing the access point associated with the first Wi-Fi radio to broadcast additional SSIDs. In another instance, the Wi-Fi HMS 301 may decide, based on current optimization constraints, that neither of the two prior solutions is suitable in the current scenario. The Wi-Fi HMS 301 may instead decide to optimize network 300 in response to the detected high level of users on the first Wi-Fi radio by activating a second Wi-Fi radio within the access point holding the first Wi-Fi radio.

The Wi-Fi HMS 301 can make various optimizing configuration changes that are tailored to the source of the low health score(s) of the Wi-Fi radio(s). For example, if a first Wi-Fi radio has a low health score that is triggered by a high channel contention, the Wi-Fi HMS 301 may instruct an access point associated with the first Wi-Fi radio to utilize a different channel. In doing so, the Wi-Fi HMS 301 may first analyze the channels utilized by the access point and surrounding access points.

The Wi-Fi HMS 301 may, when weighing potential optimizations for a first Wi-Fi radio embedded in a first access point, evaluate surrounding access points. For example, the first Wi-Fi radio may have a low health score due to a high level of users. In contrast, a neighboring Wi-Fi radio may have comparably low level of users. In such a case, the Wi-Fi HMS 301 may instruct the access point associated with the neighboring Wi-Fi radio to increase its power level. Increasing the power level of an access point will increase the coverage provided by the access point. Therefore, if the neighboring access point increases its power, a portion of the users from the first access point can instead connect to the neighboring access point, thus easing the congestion on the first access point.

Once the rules engine has acquired sufficient data (in terms of measured values, calculated values, and optimizations), Wi-Fi HMS 301 may utilize the rules engine to anticipate potential future glitches on network 300. In certain instances, Wi-Fi HMS 301 may then take pre-emptive steps in the form of dynamic reconfigurations of the components of network 300 and network 300 itself. For example, if the rules engine determines, through historical trend analysis, that traffic at certain access point locations peaks during certain hours of the day, Wi-Fi HMS 301 can increase the resources available at those locations during those hours (by increasing the power at the relevant access point locations, by instructing the relevant access points to broadcast additional SSIDs, by instructing the relevant access points to activate additional Wi-Fi radios, etc.). The Wi-Fi HMS 301 may later, once the additional resources are no longer necessary, re-optimize the network by instructing the relevant access points to revert back to their original settings (decreasing the power at the access points, stop broadcasting certain SSIDs, deactivate select Wi-Fi radios, etc.).

In other instances however, Wi-Fi HMS 301 may determine, based on the information provided by the rules engine, that no optimization of the network components is necessary. For example, if the health score for one or more Wi-Fi radios is lower than a minimum value, Wi-Fi HMS 301 may analyze the calculated parameters of the one or more Wi-Fi radio (SNR average, NU, IS, CC). After determining which of the of the calculated parameters is causing the low health score, Wi-Fi HMS 301 may survey the rules engine. The rules engine may analyze its stored sets of historical data and determine that the low health scores are indicative of a sporadic event and recommend to the Wi-Fi HMS 301 that no optimization steps be taken. For example, select yearly holidays often result in large crowds gathering in concentrated areas for a relatively short period of time (for example, yearly Independence Day celebrations). In such an instance, though access points located in these areas may report low health scores, the rules engine may correctly attribute the low health scores to the once-a-year event and recommend that no further optimizations be performed.

Wi-Fi HMS 301 may be a stand-alone program utilized by various service providers, such as Internet-service providers (ISPs), to monitor the state of a Wi-Fi network by analyzing the health scores of the Wi-Fi radios that make up the network. Additionally, the service providers may integrate Wi-Fi HMS 301 with other system components to produce a more detailed and accurate diagnosis of the state of the network. For example, an ISP may integrate Wi-Fi HMS 301 with its billing system. This integration may then be utilized by the Wi-Fi HMS 301 when managing network 300. For example, if a Wi-Fi radio in access point 304*a* reports a low health score, Wi-Fi HMS 301 may transmit the extracted MAC address associated with the measured parameters to the billing system. The billing system may utilize the MAC address to pinpoint the latitudinal and longitudinal location of access point 304*a*. This information may be used to compare the user traffic on access point 304*a* with user traffic on geographically neighboring access points. In turn, this information may be utilized by Wi-Fi HMS 301 to determine if any issues related to the Wi-Fi radio in access point 304*a* are local or more widespread. If the issues related to the Wi-Fi radio in access point 304*a* are local, the optimizations effectuated by Wi-Fi HMS 301 may emphasize locally available resources (for example, instructing access point 304*a* and geographically neighboring access points to broadcast additional SSIDs). However, if the issues related to the Wi-Fi radio in access point 304*a* are global, the optimizations effectuated by Wi-Fi HMS 301 may include increasing the available resources (for example, recommending that new access points be installed in the geographic region).

The integration between Wi-Fi HMS 301 and the billing system of the ISP may further be utilized by the ISP to make larger-scale decisions, such as business decisions. ISP may make business decisions by utilizing Wi-Fi HMS 301 and the billing system to track customer traffic at public locations. For example, an ISP may have installed access points throughout a first public location, such as a train station. Wi-Fi HMS 301 may collect measured data (including associated MAC addresses) from the Wi-Fi radios in these access points. Wi-Fi HMS 301 may use the measured data to calculate the Wi-Fi parameters discussed above (SNR average, NU, IS, CC) and to subsequently assess the health of the Wi-Fi radios in the access points. Additionally, Wi-Fi HMS 301 may, in combination with the extracted MAC addresses and billing system, provide an assessment of the customer base utilizing the access points. In turn, the ISP can use the assessment of the customer base to make a variety of business decisions.

For example, if Wi-Fi HMS 301 indicates, via the billing system, that the customer base connecting to the access points tends to be within a certain age or gender demographic, ISP can target its advertising in the public location and surrounding areas to the specific age or gender demographic. Alternatively, ISP can target its advertising in the public location and surrounding areas to those outside the indicated age or gender demographic, in order to attract new users to its service.

The ISP can also analyze the Wi-Fi radio health scores and the calculated parameters used in determining the score to make similar business decisions. For example, if the health score for a first Wi-Fi radio in the train station is lower than a minimum value, Wi-Fi HMS 301 may analyze the calculated parameters of the first Wi-Fi radio (SNR average, NU, IS, CC). After determining which of the of the calculated parameters is causing the low health score, Wi-Fi HMS 301 may survey the rules engine for possible optimizations and implement select optimizations. Additionally, the ISP may analyze the calculated parameters to make larger-scale business decisions. In one instance, the ISP may determine that the number of users (NU) at the public location is below a threshold level and that the ISP should increase its advertising at the public location. In another example, the ISP may determine that the number of users (NU) at the public location is above a threshold level and that the ISP should divert advertising resources elsewhere.

The various features described above are merely non-limiting examples, and can be rearranged, combined, sub-divided, omitted, and/or altered in any desired manner. For example, features of the computing device (including the remote control device and the terminal device) described herein can be subdivided among multiple processors and computing devices. The true scope of this patent should only be defined by the claims that follow.

What is claimed is:

1. A method comprising:
receiving one or more data packets comprising one or more parameters associated with a wireless radio, wherein the one or more data packets are associated with a polling cycle;
determining, based on the one or more parameters, a signal-to-noise ratio value associated with the wireless;
determining, based on the one or more parameters, a number of users associated with the wireless radio;
determining, based on the one or more parameters, interface statistics associated with the wireless radio;
determining, based on the one or more parameters, a channel contention associated with the wireless radio;
determining a weight for each of the signal-to-noise ratio value, a number of users, the interface statistics, and the channel contention;
determining a health score for the wireless radio, for the polling cycle, based on a weighted signal-to-noise ratio value, a weighted number of users, a weighted interface statistics, and a weighted channel contention; and
causing at least one configuration parameter of the wireless radio to be updated based on the determined health score.

2. The method of claim 1, further comprising extracting a total number of packets transmitted by the wireless radio during a first interval and a total number of packets re-transmitted by the wireless radio during the first interval.

3. The method of claim 2, wherein determining the interface statistics comprises determining the total number of packets transmitted by the wireless radio during the polling cycle and a total number of packets re-transmitted by the wireless radio during the polling cycle.

4. The method of claim 3, wherein determining the interface statistics further comprises determining the total number of packets transmitted by the wireless radio during a prior polling cycle and a total number of packets re-transmitted by the wireless radio during the prior polling cycle.

5. The method of claim 1, further comprising assigning a default value to the number of users associated with the wireless radio based on a comparison of when the number of users associated with the wireless radio for the polling cycle to a minimum value.

6. The method of claim 1, further comprising assigning a default value to the signal-to-noise ratio value associated with the wireless radio based on a comparison of the signal-to-noise ratio value associated with the wireless radio for the polling cycle to a minimum value.

7. The method of claim 1, wherein the determining the weight for each of the signal-to-noise ratio value, a number of users, the interface statistics, and the channel contention comprises determining a first weight to the signal-to-noise ratio value, the interface statistics and the channel contention, and determining a second weight to the number of users, wherein the first weight and the second weight are different.

8. The method of claim 7, wherein the first weight is 30% and the second weight is 10%.

9. The method of claim 1, wherein determining the health score comprises summing the weighted signal-to-noise ratio average, the weighted number of users, the weighted interface statistics, and the weighted channel contention.

10. The method of claim 1, further comprising transmitting a new value for the at least one configuration parameter to the wireless radio based on the determined health score.

11. A method comprising:
determining, for a first time interval, a signal-to-noise ratio average of a wireless radio;
determining, for the first time interval, a number of users associated with the wireless radio;
determining, for the first time interval, interface statistics associated with the wireless radio;
determining, for the first time interval, a channel contention of the wireless radio;
determining calculating a health score for the wireless radio based on weighted values of: the signal-to-noise ratio average, the number of users, the interface statistics, and the channel contention; and
transmitting one or more configuration parameters to an access point associated with the wireless radio based on the determined score.

12. The method of claim 11, wherein determining the interface statistics associated with the wireless radio comprises determining a total number of packets transmitted by the wireless radio during the first time interval and a total number of packets re-transmitted by the wireless radio during the first time interval.

13. The method of claim 12, wherein determining the interface statistics associated with the wireless radio for first time interval comprises determining the total number of packets transmitted by the wireless radio during a previous time interval and a total number of packets re-transmitted by the wireless radio during the previous time interval.

14. The method of claim 13, wherein the one or more configuration parameters comprise an instruction to the access point to broadcast one or more wireless network identifiers.

15. The method of claim 11, further comprising determining the one or more configuration parameters based on one or more stored rules.

16. The method of claim 15, wherein determining the one or more configuration parameters comprises performing historical trend analysis.

17. An apparatus comprising:
at least one processor; and
memory having stored therein machine executable instructions, the machine executable instructions, when executed by the at least one processor, cause the apparatus to:
receive one or more data packets comprising one or more parameters associated with a wireless radio, wherein the one or more data packets are associated with a polling cycle;
determine, based on the one or more parameters, a signal-to-noise ratio value of the wireless radio;
determine, based on the one or more parameters, a number of users associated with the wireless radio;
determine, based on the one or more parameters, interface statistics associated with the wireless radio;
determine, based on the one or more parameters, a channel contention of the wireless radio;
determine a weight for each of the signal-to-noise ratio value, the number of users, the interface statistics, and the channel contention;
determine a health score, for the polling cycle, for the wireless radio based on a weighted signal-to-noise ratio value, a weighted number of users, a weighted interface statistics, and a weighted channel contention; and
causing one or more configuration parameters of the wireless radio to be updated based on the determined health score.

18. The apparatus of claim 17, wherein the machine executable instructions, when executed by the at least one processor, further cause the apparatus to determine a first weight for the signal-to-noise ratio value, the interface statistics, and the channel contention, and determine a second weight for the number of users.

19. The apparatus of claim 18, wherein the first weight is greater than the second weight.

20. The apparatus of claim 17, wherein the machine executable instructions, when executed by the at least one processor, further cause the apparatus to:
assign the number of users a default value based on a comparison of the determined number of users to a minimum value.

* * * * *

UNITED STATES PATENT AND TRADEMARK OFFICE
CERTIFICATE OF CORRECTION

PATENT NO. : 9,961,576 B2
APPLICATION NO. : 14/883771
DATED : May 1, 2018
INVENTOR(S) : Szymanik et al.

Page 1 of 1

It is certified that error appears in the above-identified patent and that said Letters Patent is hereby corrected as shown below:

On the Title Page

Column 1, (*) Notice, Line 3:
Please delete "days. days." and insert --days.--

In the Drawings

Sheet 6 of 7, Fig. 6:
Delete "Yes"

In the Specification

Column 1, Summary, Line 27:
Delete "general" and insert --generic--

Column 6, Detailed Description, Line 34:
Delete "W-Fi" and insert --Wi-Fi--

In the Claims

Column 17, Claim 1, Line 54:
After "wireless", insert --radio--

Column 18, Claim 5, Line 21:
After "of", delete "when"

Column 18, Claim 11, Line 55:
After "determining", delete "calculating"

Signed and Sealed this
Fourteenth Day of May, 2019

Andrei Iancu
*Director of the United States Patent and Trademark Office*